E. KENNEY.
Churn.
No. 50,009. Patented Sept. 19, 1865.
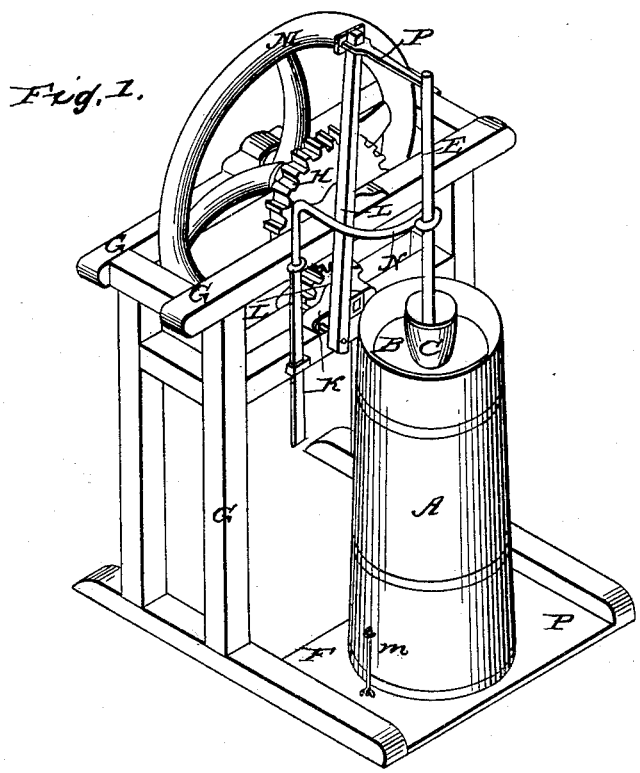
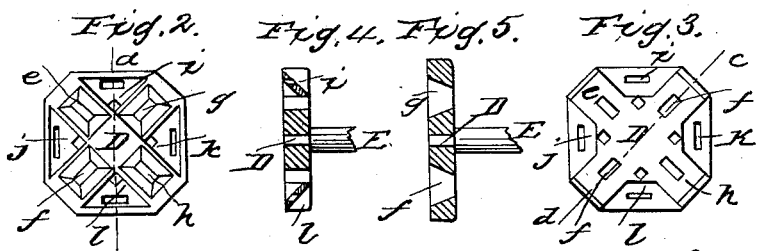
Witnesses:
Jos. L. Coombs
S. F. Lee
Inventor:
E. Kenney
by A. Pollok
his atty.

UNITED STATES PATENT OFFICE.

ELISHA KENNEY, OF LIVERMORE, MAINE.

IMPROVEMENT IN CHURNS.

Specification forming part of Letters Patent No. 50,009, dated September 19, 1865.

*To all whom it may concern:*

Be it known that I, ELISHA KENNEY, of Livermore, in the county of Androscoggin and State of Maine, have invented certain new and useful Improvements in Churns; and I hereby declare that the following is a full, clear, and exact description of the same, reference being had to the accompanying drawings, in which—

Figure 1 is a perspective view of a churn constructed in accordance with this my invention. Figs. 2 and 3 are bottom and top views, respectively, of the dasher, and Figs. 4 and 5 are sections through the dasher on lines $a\,b$ and $c\,d$ in Figs. 2 and 3, respectively.

This invention has reference to the construction and operation of the dasher and the method of transmitting movement thereto.

The churn subject to this patent belongs to that class of churns in which an upright tub and a reciprocating dasher is used; and the object of this invention is, first, to so construct the dasher as to increase frictional action between the particles of milk or cream and accelerate the separation of the butter therefrom; and, secondly, to facilitate the operation of churning by the transmission of movement, substantially in the manner hereinafter described.

In the accompanying drawings, A is the tub, constructed in the usual manner, and provided with a cover, B, and funnel C, for the collection and return of the milk or cream that may be thrown out during the operation of the dasher.

The dasher D is of a peculiar construction, and consists of a series of holes or openings surrounded by sloping or bevel surfaces.

The dasher may be made of one piece of wood, the openings and bevel-surfaces being carved out of the block, in the central opening of which the rod E is inserted; or it may be made of several pieces united by dovetail joint or otherwise, as may be deemed most convenient. In the present instance the dasher is composed of a skeleton-cross, in the center of which the rod is inserted. The four branches of the cross, marked in the drawings $e\,f\,g\,h$, are shown to be perforated, the openings expanding toward the bottom. Between the four branches are inserted inclined planes $i\,j\,k\,l$, sloping from the top and about midway down to the bottom and to the extreme ends of the four branches of the cross. Each of these inclined planes is perforated in the center. The number of perforations may be multiplied. Due regard, however, should be had to the necessary strength of parts submitted to the concussive action of churning.

A proper appreciation of the acts and effects of churning on the milk will furnish an explanation of the principle and object of the present improvement.

Butter, it is known, is a fatty matter, of more or less consistency, held suspended in the milk by means of the caseous matter and whey, with which it is intimately blended. To dissolve this union two concurrent conditions are necessary—first, an elevation of temperature; second, the mechanical separation of the globules.

Churning by the ordinary means produces the two requisite conditions; but, owing to the imperfect contrivances heretofore employed, friction between the particles of milk was inadequate to generate the necessary temperature, while the mechanical action took place, without an undue expenditure of time and labor. This I proposed to remedy, and have accomplished the same by forming the dasher as hereinbefore described—that is, of apertures surrounded with inclined faces, both internally and externally. In connection with this churn I use a platform, F, and frame G, the former to support and steady by means of hooks $m$ the tub, the latter to contain a mechanism for giving the dasher reciprocating movement by transmitting rotary movement and converting the same into reciprocating movement. To this effect upon a shaft provided with a hand-crank is mounted a cog-wheel, H, which gears with a pinion, I, upon whose shaft is fixed a crank, K, which is connected with a connecting-rod, L, coupled by means of a pin, P, with the dasher-rod.

To easily overcome the dead-point of the crank the main shaft carries a fly-wheel, M.

The dasher-rod may be truly guarded by an adjustable guide, N, and the crank-pin may be made adjustable in the crank K, so as to regulate the stroke of the dasher. The respective diameters of the cog-wheels H and I is determined by the number of strokes that is intended to be given at each revolution of the hand-crank. In this instance the dasher is reciprocated twice for every revolution of the crank.

Having now fully described my invention, I do not wish to be understood as laying claim to the manner of transmitting movement to the dasher-rod by means of two or more cog-wheels; but

What I do claim is—

1. The arrangement herein described of the gear mechanism in reference to the dasher, in combination with the adjustable guide, substantially as set forth.

2. The construction, arrangement, and operation of the reciprocating dasher of churns as described—that is to say, forming the same of bevel-faces or inclined planes, in combination with apertures, substantially as set forth.

In testimony whereof I have signed my name to this specification before two subscribing witnesses.

ELISHA KENNEY.

Witnesses:
REUEL WASHBURN,
ZENAS LANE.